United States Patent
Sun

(10) Patent No.: US 10,168,734 B2
(45) Date of Patent: Jan. 1, 2019

(54) FOLDABLE DISPLAY DEVICE AND DISPLAY APPARATUS

(71) Applicant: BOE TECHNOLOGY GROUP CO., LTD., Beijing (CN)

(72) Inventor: Yanliu Sun, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/647,221

(22) Filed: Jul. 11, 2017

(65) Prior Publication Data

US 2018/0059720 A1 Mar. 1, 2018

(30) Foreign Application Priority Data

Aug. 25, 2016 (CN) .................... 2016 2 0937489 U

(51) Int. Cl.
- *G06F 1/16* (2006.01)
- *G09F 9/30* (2006.01)

(52) U.S. Cl.
CPC .......... *G06F 1/1618* (2013.01); *G06F 1/1652* (2013.01); *G09F 9/301* (2013.01)

(58) Field of Classification Search
CPC .. H05K 5/0226; H05K 5/0021; H05K 5/0017; H05K 2201/10128; H05K 2201/2009; H05K 1/028; G06F 1/1652; G06F 1/1641; G06F 1/1681; H04M 1/0268; H04M 1/0216; H04M 1/022; G09F 9/301

USPC .......... 361/679.01, 679.02, 679.04, 679.09, 361/679.11–679.22, 679.26, 679.27, 361/679.55–679.6

See application file for complete search history.

(56) References Cited

U.S. PATENT DOCUMENTS

| | | | |
|---|---|---|---|
| 9,540,856 B2* | 1/2017 | Lin ...................... | G06F 1/1681 |
| 2007/0186375 A1* | 8/2007 | Luca ...................... | E05F 3/108 |
| | | | 16/72 |
| 2009/0195993 A1* | 8/2009 | Herd .................. | G06Q 20/1085 |
| | | | 361/724 |
| 2010/0041448 A1* | 2/2010 | Gaddy ................. | G06F 1/1616 |
| | | | 455/575.3 |
| 2013/0002114 A1* | 1/2013 | Hamers ................ | G06F 1/1652 |
| | | | 312/319.5 |
| 2013/0021762 A1* | 1/2013 | van Dijk ............... | G06F 1/1652 |
| | | | 361/749 |
| 2013/0145695 A1* | 6/2013 | Wach ........................ | E05F 5/02 |
| | | | 49/381 |
| 2014/0042293 A1* | 2/2014 | Mok ..................... | G06F 1/1652 |
| | | | 248/682 |
| 2014/0055938 A1* | 2/2014 | Hsu ....................... | G06F 1/1624 |
| | | | 361/679.21 |

(Continued)

*Primary Examiner* — Steven T Sawyer
*Assistant Examiner* — Sagar Shrestha
(74) *Attorney, Agent, or Firm* — Kinney & Lange, P.A.

(57) ABSTRACT

A foldable display device includes a flexible display screen and a support back plate fitted to the flexible display screen. The support back plate includes a first support plate and a second support plate that is articulated with the first support plate by a double-shaft articulated mechanism. The double-shaft articulated mechanism includes a first rotation shaft pivotally coupled to the first support plate, a second rotation shaft pivotally coupled to the second support plate and a tension releasing mechanism provided between the first rotation shaft and the second rotation shaft.

14 Claims, 4 Drawing Sheets

(56) References Cited

U.S. PATENT DOCUMENTS

| | | | |
|---|---|---|---|
| 2014/0111954 A1* | 4/2014 | Lee | G06F 1/1641 |
| | | | 361/749 |
| 2014/0355195 A1* | 12/2014 | Kee | G06F 1/1616 |
| | | | 361/679.27 |
| 2015/0370287 A1* | 12/2015 | Ko | G06F 1/1626 |
| | | | 361/749 |
| 2017/0264723 A1* | 9/2017 | Mok | H04M 1/0268 |
| 2017/0356227 A1* | 12/2017 | Maatta | E05D 11/105 |

* cited by examiner

FOLDABLE DISPLAY DEVICE AND DISPLAY APPARATUS

CROSS-REFERENCE TO RELATED APPLICATION

The present application claims priority to Chinese Patent Application No. 201620937489.X, filed on Aug. 25, 2016, entitled "FOLDABLE DISPLAY DEVICE", which is incorporated herein by reference in its entirety.

BACKGROUND

Technical Field

The present disclosure generally relates to technical field of display, and particularly to a foldable display device.

Description of the Related Art

Recently, with development of display technique, portable terminals such as a mobile phone, a flat computer, etc. are immensely popular. However, as sizes of the portable terminals such as a mobile phone, a flat computer, etc. increase, these portable terminals become difficult to be carried.

A foldable display device may solve problem of carrying. In some cases, the foldable display device includes a flexible display screen. However, when the foldable display device is folded, a folded portion of the flexible display screen that is to be bent or folded may be bent to have a radius of curvature close to or even less than a critical radius of curvature of the flexible display screen, which may cause the flexible display screen to be damaged.

Further, the conventional foldable display device may be folded either inwardly by 180 degrees or outwardly by 180 degrees only, and cannot be folded by 360 degree.

There is needed a new foldable display device that can solve the above problems.

SUMMARY

The present disclosure provides a new foldable display device and display apparatus, which can achieve 360 degrees turning of a flexible display screen and ensure to best extent the flexible display screen will not be damaged and allow it to be fixed at any turned angle for operation.

According to an aspect of the present disclosure, there is provided a foldable display device, including a flexible display screen and a support back plate fitted to the flexible display screen, the support back plate comprises a first support plate and a second support plate that is articulated with the first support plate by a double-shaft articulated mechanism, and the double-shaft articulated mechanism comprises a first rotation shaft pivotally coupled to the first support plate, a second rotation shaft pivotally coupled to the second support plate and a tension releasing mechanism provided between the first rotation shaft and the second rotation shaft.

In a preferable embodiment of the present disclosure, the tension releasing mechanism comprises at least two slider-traveller assembles, each of the slider-traveller assembles comprises a slider coupled to the first rotation shaft and a traveller coupled to the second rotation shaft, and the traveller is slidable in the slider.

In an alternative embodiment, the tension releasing mechanism comprises at least two slider-traveller assembles, each of the slider-traveller assembles comprises a slider integrally formed with the first rotation shaft and a traveller integrally formed with the second rotation shaft, and the traveller is slidable in the slider.

In an embodiment of the disclosure, the tension releasing mechanism includes three said slider-traveller assembles, which arranged along the double-shaft articulated mechanism and uniformly spaced apart from one another. It is advantageous that the three slider-traveller assembles are arranged such that two are respectively arranged at either end of the double-shaft articulated mechanism and one is arranged at a middle position of the double-shaft articulating mechanism.

In an advantageous embodiment, the first rotation shaft is frictionally engaged with the first support plate and the second rotation shaft is frictionally engaged with the second support plate such that the foldable display screen may be fixed at any turning angle for operation.

In an embodiment, the foldable display device is further provided with a protective jacket extending over the support back plate and made of a material having flexibility.

In an embodiment, the material having flexibility includes leather, elastic rubber or flexible plastic.

In an embodiment of the present disclosure, the protective jacket is configured to be in a slightly compressed state when the flexible display screen is unfolded such that a portion of the protective jacket near to the double-shaft articulated mechanism is formed as a compressed portion, ensuring a suitable back tension generated by compression.

The present disclosure further provides a display apparatus including the above foldable display device.

BRIEF DESCRIPTION OF THE DRAWINGS

Exemplary embodiments of the present disclosure will be described with reference to the drawings, in which.

DETAILED DESCRIPTION OF THE EMBODIMENTS

Figure 1:
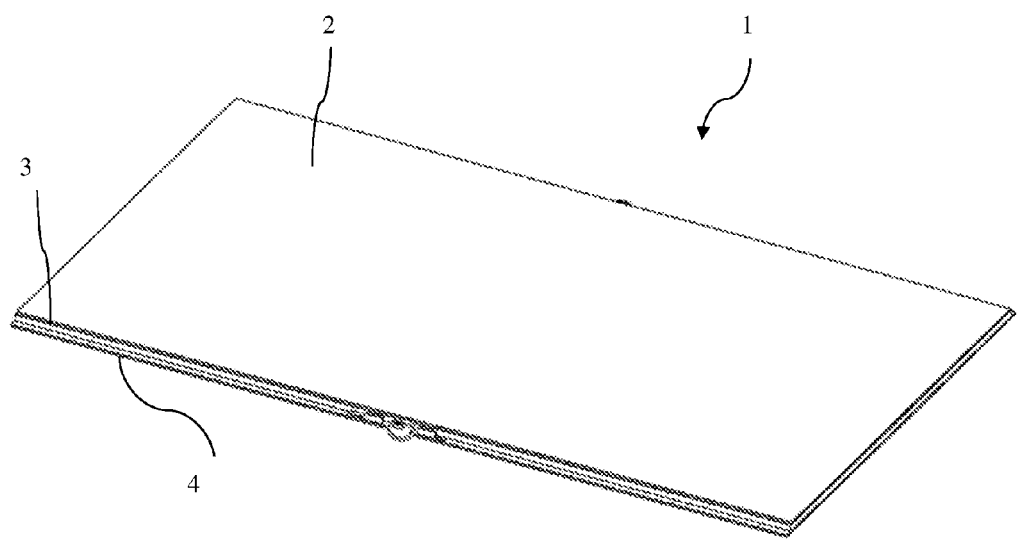
FIG. 1 illustrates a whole schematic view of a foldable display device in an unfolded state according to an embodiment of the present disclosure.

Exemplary embodiments of the present disclosure are described in detailed below. The exemplary embodiments described below and illustrated in the drawings tend to teach principle of the present disclosure so as to allow those skilled in the art to implement and use the invention in various situations and applications.

Figure 2:
FIG. 2 illustrates a schematic view of the foldable display device, as shown in FIG. 1, in an inwardly-folded state.
Figure 3:
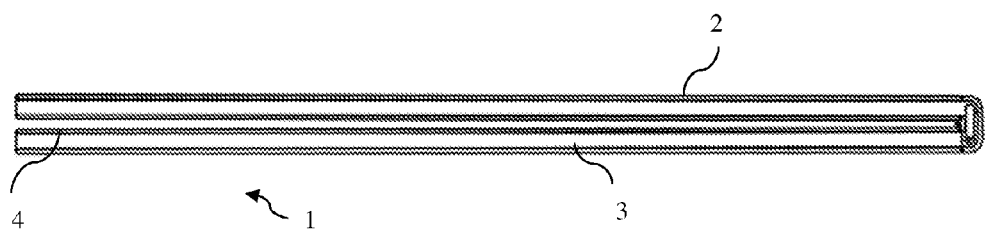
FIG. 3 illustrates a schematic view of the foldable display device, as shown in FIG. 1, in an outwardly-folded state.

FIGS. 1-3 illustrates an embodiment of the present disclosure. As shown in Figures, a foldable display device 1 in the embodiment includes a flexible display screen 2, a protective jacket 4 and a support back plate 3 arranged between the flexible display screen and the protective jacket.

Figure 4:
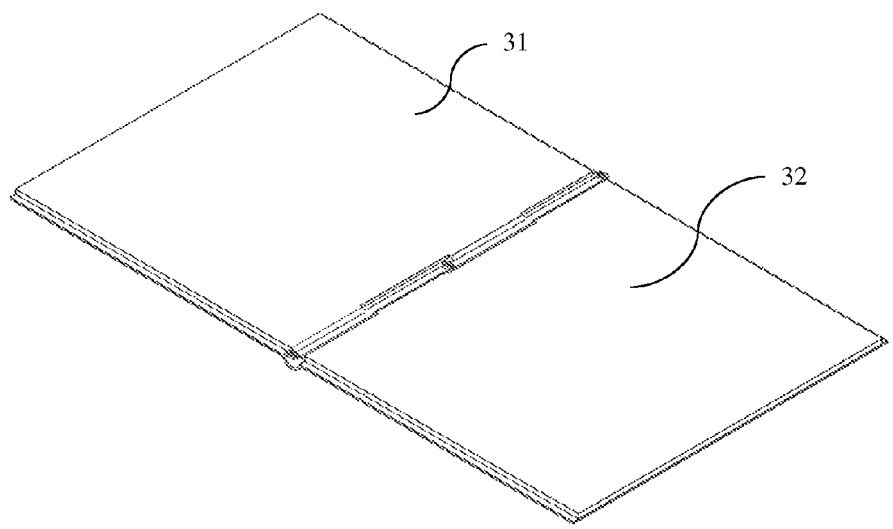
FIG. 4 illustrates a schematic view of the foldable display device, as shown in FIG. 1, with a flexible display screen removed to show a double-shaft articulated mechanism.
Figure 5:
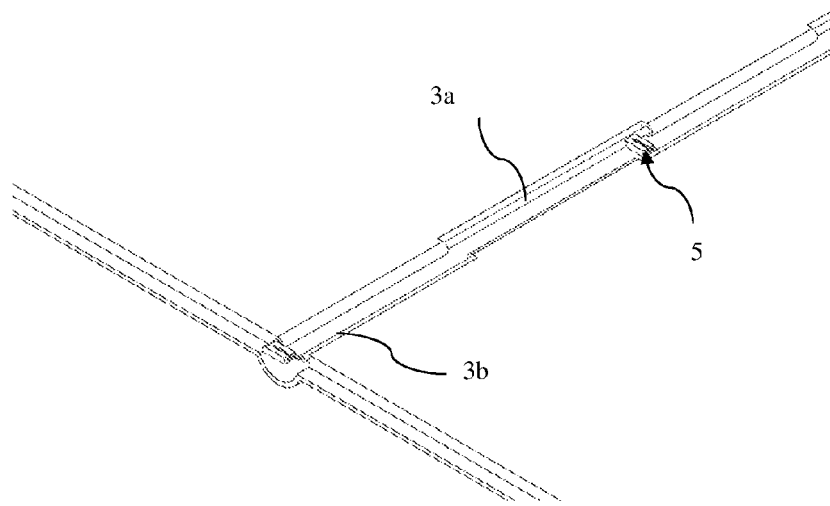
FIG. 5 is a partial enlarged view of a portion as shown in FIG. 4.

As shown in FIG. 4, the support back plate 3 includes a first support plate 31 and a second support plate 32 that is articulated with the first support plate by a double-shaft articulated mechanism. As shown in FIG. 5, the double-shaft articulated mechanism includes a first rotation shaft 3a, a second rotation shaft 3b and a tension releasing mechanism provided between the first rotation shaft and the second rotation shaft. As shown in Figures, the first rotation shaft 3a is provided at an end of the first support plate 31 and extends along a full width of the first support plate 31 such that the first support plate 31 is rotatable about the first rotation shaft 3a; the second rotation shaft 3b is configured at an end of the second support plate 32 and extends along a full width of the second support plate 32 such that the second support plate 32 is rotatable about the second rotation shaft 3b.

As shown by FIGS. 4-7, it is advantageous the tension releasing mechanism in the embodiment of the present disclosure include three slider-traveller assembles 5 that are arranged along the double-shaft articulated mechanism and uniformly spaced apart from one another. It is appreciated that two or more than three the above described slider-traveller assembles 5 may be provided according to the width of the flexible display screen 2 to ensure a structural strength of the display device, which also falls into a protective scope of the present disclosure.

In the embodiment as shown in the drawings, the slider-traveller assemble 5 includes a slider 51 coupled to the first rotation shaft 3a and a traveller 52 coupled to the second rotation shaft 3b via a connecting rod 54. In this configuration, the slider 51 is provided with a sliding way 53 therein and the traveller 52 is received in the sliding way and is slidable in the sliding way towards the first rotation shaft 3a or apart away from the first rotation shaft. It is understood that the slider may be coupled to the second rotation shaft and correspondingly, the traveller is coupled to the first rotation shaft in another embodiment that is covered by the scope of the present disclosure.

In an alternative embodiment (not shown), the slider may be formed integrally with the first rotation shaft and the traveller may be formed integrally with the second rotation shaft, and vice versa. With this configuration, a structure of the slider-traveller assemble may be simplified.

In the embodiment as shown in FIG. 4, the first rotation shaft 3a is mounted to the first support plate by two first bearing portions 31a that are disposed at either end of the first support plate 31, and the second rotation shaft 3b is mounted to the second support plate by two second bearing portions 32a that are disposed at either end of the second support plate 32, the two first bearing portion 31a and the two second bearing portion 32a being staggered each other to save an available space. It is understood that three or more bearing portions may be provided according to the width of the flexible display screen so as to increase structural stability of the foldable display device.

It is advantageous that the first rotation shaft 3a and the second rotation shaft 3b may be configured to have a certain coarseness, and portions of the first bearing portion 31a and the second bearing portion 32a, which are in contact with the first rotation shaft 3a or the second rotation shaft 3b, are also configured to have a certain coarseness, such that the first rotation shaft is frictionally engaged with the first bearing portion and the second rotation shaft is frictionally engaged with the second bearing portion. The foldable display device 1 may be fixed at any turning angle by appropriately configuring an interface with a coefficient of friction between the rotation shafts and the bearing portions.

In the present disclosure, the protective jacket 4 may be made of a material having flexibility, such as leather, elastic rubber or flexible plastic. It is advantageous that the protective jacket is configured to be in a slightly compressed state when the flexible display screen 2 is unfolded such that a portion of the protective jacket near to the double-shaft articulated mechanism is formed into a compressed portion 41.

Figure 6:
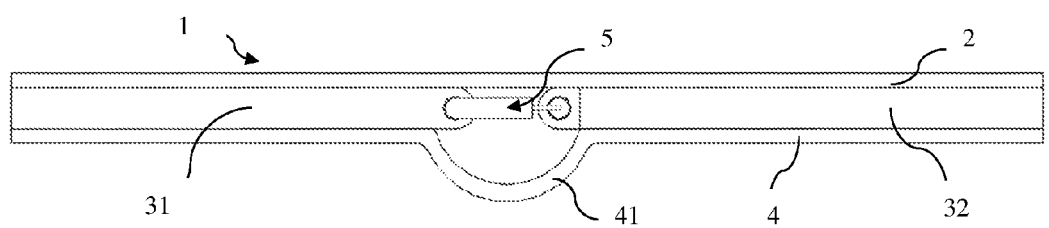
FIG. 6 is a side view of the foldable display device as shown in FIG. 1.
Figure 7:
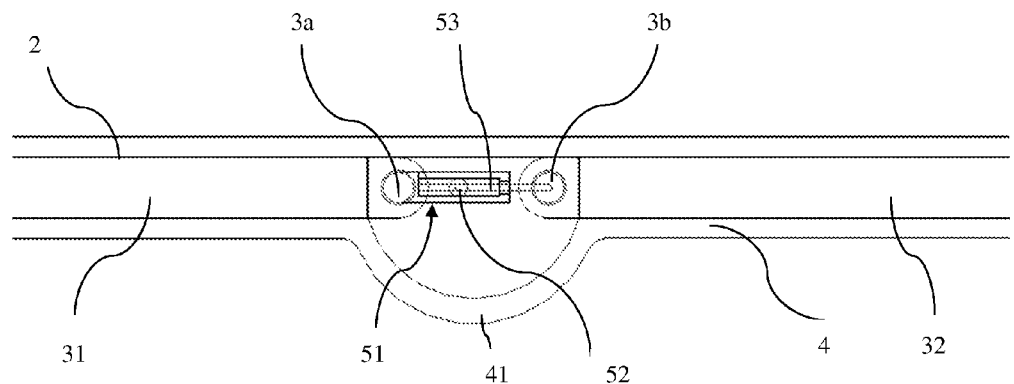
FIG. 7 is a partial enlarged view of a portion as shown in FIG. 6.

As shown in FIGS. 1, 6 and 7, when the foldable display device 1 is in the unfolded state, the traveller 52 is located in the middle position of the sliding way 53, the flexible display screen 2 is naturally unfolded and the protective jacket 4 is in the slightly compressed state. As the protective jacket 4 is made of a flexible material such as leather, elastic rubber or flexible plastic, it ensures that the protective jacket has a suitable reverse tension when be unfolded. In addition, as the contact face between the first rotation shaft 3a and the first bearing portion 31a of the first support plate involves damped friction when relative movement therebetween occurs, it may be ensured that the traveller will not be pushed to move along the sliding way automatically by the tension from the protective jacket.

Figure 8:
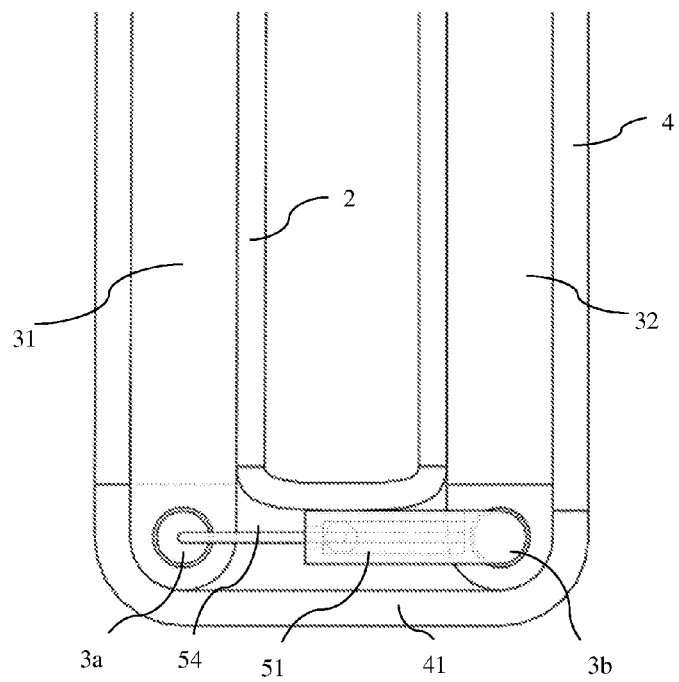
FIG. 8 is a partial enlarged view of a portion of the foldable display device in the inwardly-folded state as shown in FIG. 2.

As shown in FIGS. 2 and 8, when the foldable display device 1 is turned and folded inwardly, under the tension of the protective jacket 4 and a pull force that drives the first support plate 31 and the second support plate 32 of the support back plate 3 to move towards each other, the traveller 52 slides (outwardly) in a direction apart from the first rotation shaft 3a along the sliding way 53, such that a distance between the first support plate 31 and the second support plate 32 of the support back plate 3 increases and the flexible display screen 2 may be naturally bent. Further, as the flexible display screen 2 is supported by the slider, it can avoid wrinkle from be generated due to bending of the flexible display screen, protecting the flexible display screen from being damaged. When the foldable display device 1 is turned and folded into the state as shown in FIG. 2, the protective jacket appears a nature state where it is not compressed.

Figure 9:
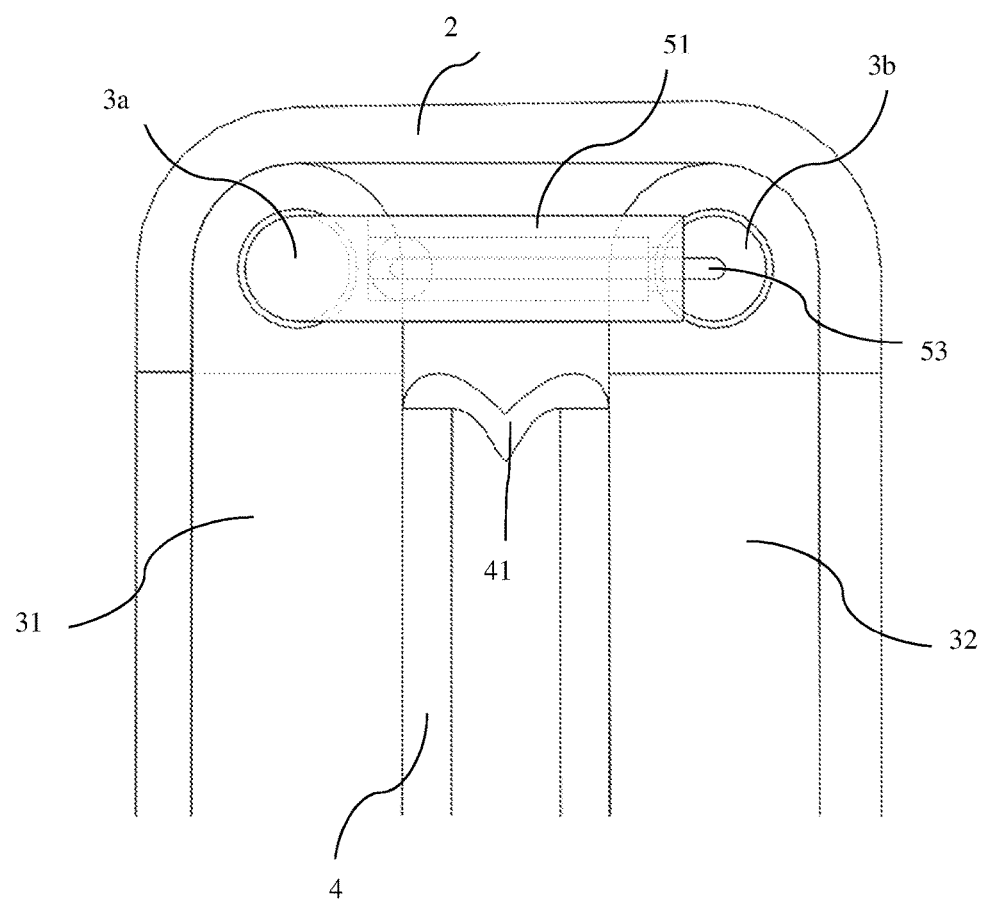
FIG. 9 is a partial enlarged view of a portion of the foldable display device in the outwardly-folded state as shown in FIG. 3.

As shown in FIGS. 3 and 9, when the foldable display device 1 is turned outwardly, the traveller 52 moves (inwardly) towards the first rotation shaft along the sliding way 53 due to the tension of the flexible display screen 2, such that the distance between the first support plate 31 and the second support plate 32 of the support back plate 3 decreases to ensure the tension upon the flexible display screen 45 may be released completely, protecting the flexible display screen from being damaged. When the foldable display device 1 is turned outwardly into the state as shown in FIG. 3, the compressed portion 41 of the protective jacket is in the compressed state.

The foldable display device according to the present disclosure may achieve an overturn operation of up to 360 degrees and protect the screen from being damaged to best extent, and may be fixed for operation at any turning angle.

According another embodiment of the present disclosure, there is provided a display apparatus including the foldable display device as described above. The specific structure of the foldable display device has been described in the above embodiment and is not repeated again.

Exemplarily, the display apparatus may be an organic light emitting diode (OLED) panel, a mobile phone, a flat computer, a display, a notebook computer, a digital photo frame, a navigator or any product or component that has a displaying function.

It is noted that the above description is intend for illustration, and those skilled in the art may make various modifications and changes to the embodiments of the present disclosure based on the above description. The modifications and changes fall into protective scope of the present disclosure.

The invention claimed is:

1. A foldable display device comprising a flexible display screen and a support back plate fitted to the flexible display screen, wherein:
the support back plate comprises a first support plate and a second support plate that is articulated with the first support plate by a double-shaft articulated mechanism, the double-shaft articulated mechanism comprising:
a first rotation shaft pivotally coupled to the first support plate,
a second rotation shaft pivotally coupled to the second support plate, and
a tension releasing mechanism provided between the first rotation shaft and the second rotation shaft;
wherein the tension releasing mechanism comprises at least two slider-traveller assembles, wherein each of the slider-traveller assembles comprises a slider and a traveller slidable in the slider, an end of one of the slider and the traveller is coupled to the first rotation shaft and an end of the other of the slider and the traveller is coupled to the second rotation shaft, such that during opening or folding the first support plate and the second support plate, the first support plate rotates about the first rotation shaft and the second support plate rotates about the second rotation shaft, and such that through movement of the traveller in the slider, the first rotation shaft moves towards the second rotation shaft with the end of one of the slider and the traveller as opening the first support plate and the second support plate, and the first rotation shaft moves away from the second rotation shaft with the end of one of the slider and the traveller as folding the first support plate and the second support plate.

2. The foldable display device according to claim 1, wherein, the tension releasing mechanism comprises at least two slider-traveller assembles, wherein each of the slider-traveller assembles comprises a slider integrally formed with the first rotation shaft and a traveller integrally formed with the second rotation shaft, and the traveller is slidable in the slider.

3. The foldable display device according to claim 1, wherein, the tension releasing mechanism comprises three slider-traveller assembles, arranged along the double-shaft articulated mechanism and uniformly spaced apart from one another.

4. The foldable display device according to claim 3, wherein, the three slider-traveller assembles are respectively arranged at two ends and a middle position of the double-shaft articulated mechanism.

5. The foldable display device according to claim 1, wherein, the first rotation shaft is frictionally engaged with the first support plate and the second rotation shaft is frictionally engaged with the second support plate.

6. The foldable display device according to claim 1, wherein, the material having flexibility comprises leather, elastic rubber or flexible plastic.

7. A display apparatus, comprising the foldable display device according to claim 1.

8. The foldable display device according to claim 1, wherein, the traveller is coupled to the second rotation shaft by a connecting rod.

9. The foldable display device according to claim 2, wherein, the tension releasing mechanism comprises three slider-traveller assembles, arranged along the double-shaft articulated mechanism and uniformly spaced apart from one another.

10. The foldable display device according to claim 1, wherein, the first rotation shaft is frictionally engaged with the first support plate and the second rotation shaft is frictionally engaged with the second support plate.

11. The foldable display device according to claim 2, wherein, the first rotation shaft is frictionally engaged with the first support plate and the second rotation shaft is frictionally engaged with the second support plate.

12. The foldable display device according to claim 1, wherein, the foldable display device is further provided with a protective jacket extended over the support back plate and made of a material having flexibility.

13. The foldable display device according to claim 2, wherein, the foldable display device is further provided with a protective jacket extended over the support back plate and made of a material having flexibility.

14. The foldable display device according to claim 1, wherein the support back plate is disposed between the flexible display screen and the protective jacket.

* * * * *